May 12, 1925.                                                                    1,537,086
G. ISCHENHOUSER
COMBINED PERCH AND TRAP
Filed March 13, 1922
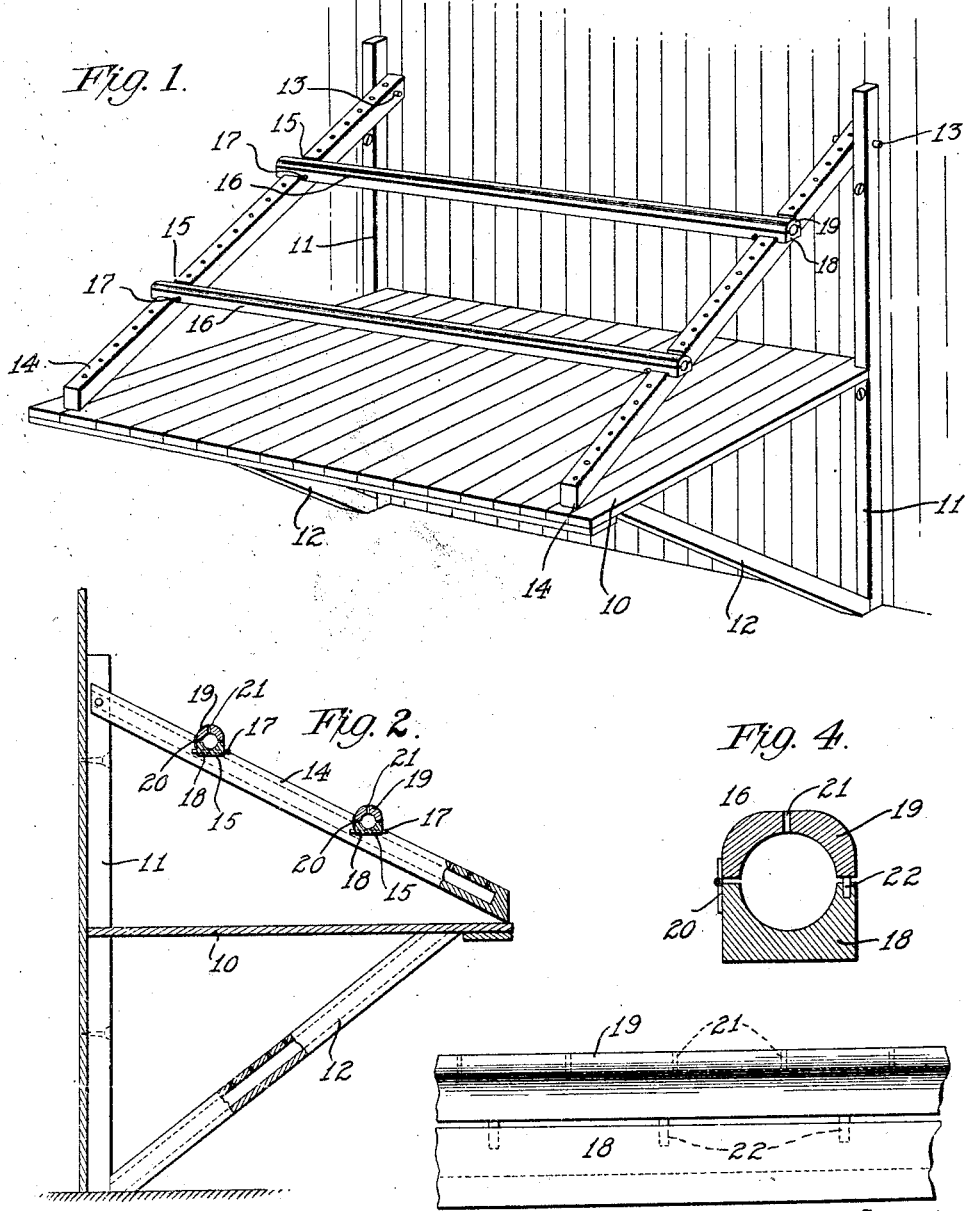
Inventor:
Gust Ischenhouser.
his Attorneys Patented May 12, 1925.

1,537,086

UNITED STATES PATENT OFFICE.

GUST ISCHENHOUSER, OF CLIFFORD, MASSACHUSETTS.

COMBINED PERCH AND TRAP.

Application filed March 13, 1922. Serial No. 543,420.

*To all whom it may concern:*

Be it known that I, GUST ISCHENHOUSER, a citizen of the United States, residing at Clifford, in the county of Bristol and State of Massachusetts, have invented new and useful Improvements in Combined Perches and Traps, of which the following is a specification.

This invention relates to a poultry roost construction, and has as its object the provision of a knock-down roost which may be readily assembled in position for use, and which may be taken down for the purpose of cleaning the perches and other parts of the structure.

Another object of the invention is the provision of an improved perch bar adapted to serve as a trap for vermin and poultry lice.

In the accompanying drawings there is shown one form of a device in which the invention may be embodied, and in these drawings:—

Fig. 1 is a perspective showing the device assembled,

Fig. 2 is a side elevational view of the structure shown in Fig. 1,

Fig. 3 is a front elevational view of a portion of one of the perch bars, and

Fig. 4 is a cross sectional view of a perch bar.

Referring to the drawings for a more detailed description, 10 indicates a suitable platform or support sustained in position by means of uprights 11 and braces 12. The uprights extend above the platform so as to receive pins 13 secured to the ends of strips 14 having seats 15 serving to receive the transversely extending perch bars 16. The pins 13 serve detachably to secure the perch bar supporting strips to the uprights, and the perch bars are normally maintained in position against longitudinal movement by means of pins 17 extending forwardly adjacent each end of the perch bars; the pins also serve to prevent the strips 14 from moving inwardly and thereby being accidentally detached from the uprights.

The perch bars and also, preferably, the supporting strips are of hollow construction in order to serve as traps for vermin and poultry infecting lice.

Referring more particularly to Figs. 3 and 4, wherein the construction of these bars is more clearly shown, each length comprises two longitudinal sections 18, 19 which are hinged together by means of hinges 20. The upper section is provided with a plurality of openings 21 communicating with the interior of the perches and permitting the vermin to enter the chamber within the bars. In order to provide an additional inlet the lower section has secured therein pins 22 which hold slightly spaced apart the meeting faces of the two sections. As shown in Fig. 2, the platform supporting braces may be constructed in the same manner as the supporting strips. The supporting strips, as shown in Figure 2, are hollow and may if desired be formed of two sections hinged together in the same manner as the perch bars shown in Figure 4.

Whenever desirable the entire device may be quickly taken down for the purpose of cleaning out the perch bars and supporting strips, the entire roost construction being, therefore, a thoroughly sanitary one. Particular attention is called to the simplicity of the structure and to the manner in which the supporting pins 13 and 17, which may be permanently secured to the strips and perches, serve very efficiently to prevent accidental disassociation of the various parts. In order to assemble the various parts of the structure it is not necessary to employ additional securing means, such as nails or bolts, since the perch bars and supporting strips are provided with the pins for this purpose.

I claim:

1. A knock-down poultry roost construction comprising a pair of uprights, a plurality of perch supporting strips detachably secured to said uprights and having seats extending transversely of said strips, perch bars said bars having pins adapted to engage the sides of the strips and prevent both longitudinal movement of the bars relatively to said strips and accidental detachment of the supporting strips from said uprights.

2. A knock-down poultry roost construction comprising uprights, a pair of perch supporting strips having therein a plurality of seats for perch bars, pins in said strips detachably securing the strips to the uprights, a plurality of perch bars removably positioned in said seats, and pins in said perch bars adapted to engage the sides of said supporting strips preventing longitudinal movement of the perch bars in their seats and holding said supporting strips against accidental detachment from the uprights.

3. A knock-down poultry roost construction comprising uprights, a pair of perch supporting strips having therein a plurality of seats for perch bars, pins in said strips detachably securing the strips to the uprights, a plurality of perch bars removably positioned in said seats, and pins in said perch bars adjacent said supporting strips preventing longitudinal movement of the perch bars in their seats and holding said supporting strips against accidental detachment from the uprights, said perch bars each being hollow and having a plurality of openings communicating with the interior of the bar.

In testimony whereof I have hereunto set my hand.

GUST ISCHENHOUSER.